(12) United States Patent
Heisch

(10) Patent No.: US 11,592,143 B2
(45) Date of Patent: Feb. 28, 2023

(54) METHOD FOR TRANSFERRING A CRYOGENIC FLUID AND TRANSFER SYSTEM FOR IMPLEMENTING SUCH A METHOD

(71) Applicant: Cryostar SAS, Hesingue Grand Est (FR)

(72) Inventor: Philippe Heisch, Huningue (FR)

(73) Assignee: Cryostar SAS, Hesingue (FR)

( * ) Notice: Subject to any disclaimer, the term of this patent is extended or adjusted under 35 U.S.C. 154(b) by 462 days.

(21) Appl. No.: 16/631,499

(22) PCT Filed: Jul. 17, 2018

(86) PCT No.: PCT/EP2018/069436
§ 371 (c)(1),
(2) Date: Jan. 16, 2020

(87) PCT Pub. No.: WO2019/016232
PCT Pub. Date: Jan. 24, 2019

(65) Prior Publication Data
US 2020/0173608 A1   Jun. 4, 2020

(30) Foreign Application Priority Data

Jul. 21, 2017 (EP) .................................. 17305977

(51) Int. Cl.
*F17C 6/00* (2006.01)
*F17C 5/02* (2006.01)
*F17C 13/00* (2006.01)

(52) U.S. Cl.
CPC ................ *F17C 5/02* (2013.01); *F17C 13/00* (2013.01); *F17C 2205/0323* (2013.01);
(Continued)

(58) Field of Classification Search
CPC ................ F17C 6/00; F17C 2223/0107; F17C 2223/013; F17C 2223/042;
(Continued)

(56) References Cited

U.S. PATENT DOCUMENTS 3,191,395 A * 6/1965 Maher .................... F17C 13/126
62/52.1
5,771,946 A * 6/1998 Kooy ........................ F17C 6/00
141/2

(Continued)

OTHER PUBLICATIONS

International Search Report of the International Searching Authority for PCT/EP2018/069436 dated Oct. 12, 2018.

*Primary Examiner* — Brian M King
(74) *Attorney, Agent, or Firm* — Millen White Zelano & Branigan, PC; Brion P. Heaney

(57) ABSTRACT

A method for transferring cryogenic fluid from a storage tank (2; 12; 16) to a receiver (6; 8; 10; 14; 16; 18) like a receiving tank or to an application device, according to the invention comprises the steps of: a—pumping cryogenic liquid from the storage tank (2; 12; 16), b—vaporising at least partially the pumped cryogenic liquid, c—pressurising the storage tank (2; 12; 16) with the vaporised cryogenic liquid, and d—transferring cryogenic fluid to the receiver (6; 8; 10; 14; 16; 18) with cryogenic fluid from the storage tank (2; 12; 16) through a feed line (4) between the storage tank (2; 12; 16) and the receiver (6; 8; 10; 14; 16; 18).

18 Claims, 1 Drawing Sheet

(52) U.S. Cl.
CPC  *F17C 2223/0161* (2013.01); *F17C 2225/035* (2013.01); *F17C 2227/0135* (2013.01); *F17C 2227/0393* (2013.01); *F17C 2250/0626* (2013.01); *F17C 2270/0105* (2013.01)

(58) Field of Classification Search
CPC .......... F17C 2223/046; F17C 2223/047; F17C 2227/0302; F17C 2227/0304; F17C 2227/0309; F17C 2227/0311; F17C 2227/0313; F17C 2227/0316; F17C 2227/0318; F17C 2227/032; F17C 13/00; F17C 13/004; F17C 13/005; F17C 13/006; F17C 2250/01; F17C 2225/013; F17C 5/02; F17C 2227/013
See application file for complete search history.

(56) References Cited

U.S. PATENT DOCUMENTS

| | | |
|---|---|---|
| 5,954,101 A | 9/1999 | Drube et al. |
| 2011/0179810 A1 | 7/2011 | Sipilä et al. |
| 2014/0007943 A1* | 1/2014 | Mackey .................... F17C 6/00 220/560.04 |
| 2014/0261132 A1 | 9/2014 | Zeren et al. |
| 2016/0281927 A1* | 9/2016 | Bjørn ....................... B63B 25/12 |
| 2017/0122495 A1* | 5/2017 | Fiat ........................... F17C 7/02 |

* cited by examiner

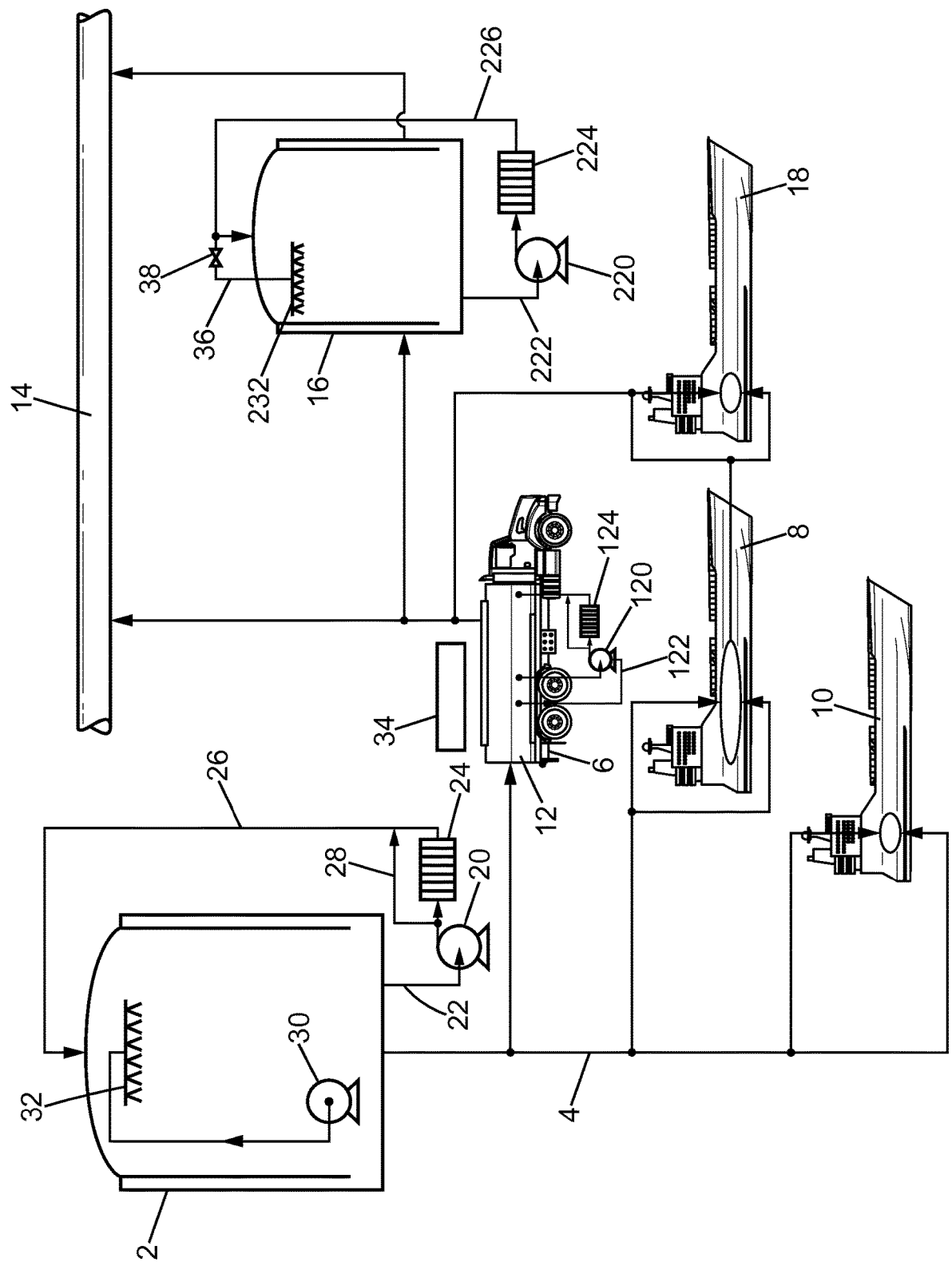

METHOD FOR TRANSFERRING A CRYOGENIC FLUID AND TRANSFER SYSTEM FOR IMPLEMENTING SUCH A METHOD

This invention relates to a method for transferring a cryogenic fluid and a transfer system for implementing such a method.

The invention concerns more specifically LNG (Liquefied Natural Gas) but it can also concern other cryogenic fluid (Nitrogen, Oxygen, Argon, . . . ). Natural gas is an energy source which is increasingly used for the supply of engines or other machines for doing work. It is now used as fuel for trucks, trains and ships. This natural gas is liquefied for transportation. Hence LNG has to be brought from the source of gas to the end user. During this long way, LNG has to be transferred several times. Since the LNG market becomes more important, the LNG transfers also become more frequent around the globe.

Between the gas well and the end user, LNG transfers usually occurs for example between:
- a fixed cryogenic pressurised tank and a transport tank (for example in a trailer or an ISO container for a road or rail transport or in a tank on a ship for a sea transport),
- a mobile cryogenic pressurised tank (trailer, container, train, ship) and a receiving tank that can either be fixed or mobile,
- a fixed or mobile cryogenic pressurised tank directly to the application for applications such as peak-shaving or power generation.

Depending mainly from the receiving tank size, these transfers need generally high flows which can go up to 20000 l/min (i.e. 0.33 $m^3 s^{-1}$) with a differential pressure up to 10 bar ($10^6$ Pa) as the transfer needs to be done within a short period of time.

In the prior art, cryogenic fluid is usually transferred from the supply tank to the receiving tank (or application) by a cryogenic pump that provides enough head in order to beat the existing pressure drops into the lines, as well as the counter pressure of the receiving tank. For obtaining such flows and such differential pressures during a cryogenic transfer, it is known to use a centrifugal cryogenic pump helping to shorten the loading time by providing flow and differential head for the LNG transfer operation.

Unfortunately, this kind of application requires big and expensive pumps to provide high flows (for example more than 10000 l/min). Moreover there is a redundancy need on this type of system which makes the investment quite expensive. These pumps are quite big as well and need some space that could be required for transportation payload purposes.

Furthermore, the flow of the known pumps usually used for cryogenic transfers is limited and it is not possible to obtain a very high flow with an "off-the-shelf" pump. High performance transfers (high flow with high pressure differential) need to develop custom-made pumps in order to provide the required performances.

A first object of the present invention is to provide a transfer method an system which allows obtaining high flows also by high pressure differentials.

A second object of the invention is to limit the bulk of the means that are needed for transferring LNG (or another cryogenic fluid) so that they can also be used with small tanks.

A third object of the invention is to limit the power consumption of the means that are needed for transferring LNG (or another cryogenic fluid). Advantageously, the transfer device according to the invention will be able to be supplied only with photovoltaic panels or a gas electric generator.

For meeting at least one of these objects or others, a first aspect of the present invention proposes a method for transferring cryogenic fluid from a storage tank to a receiver like a receiving tank or to an application device.

According to this invention, this method comprises the steps of:
- a—pumping cryogenic liquid from the storage tank,
- b—vaporising at least partially the pumped cryogenic liquid,
- c—pressurising the storage tank with the vaporised cryogenic liquid, and
- d—transferring cryogenic fluid to the receiver with cryogenic fluid from the storage tank through a feed line between the storage tank and the receiver.

In other words, this method is to use a cryogenic pump and a vaporizer in order to pressurize the storage tank in order to provide enough pressure to transfer the cryogenic fluid, and replace the cryogenic fluid that is taken off the tank. In this way, it is possible to transfer high flows of liquid through the cryogenic fluid feed line, by using a pump with a flow that is about 15 times lower (depending on the required differential pressure and on the cryogenic fluid) than the required cryogenic fluid flow to load the receiver. The cryogenic fluid that is pumped from the supply tank would go through a water or ambient air vaporizer/exchanger, in order to be converted into gas and increase its volume by factor of about 600 when the cryogenic fluid is LNG. This gas will then be sent back to the storage tank in order to push the cryogenic fluid located in the bottom of the tank through the cryogenic fluid feed line, into the receiver.

A method as described here above can also comprise a step of regulating the pressure in the storage tank by varying the part of pumped cryogenic liquid being vaporised.

It is possible to have one or more means of regulations for controlling the pressure in the storage tank. For example, this pressure can also be regulated by spraying cryogenic liquid in an upper part of the storage tank.

In order to allow a better transfer and avoid a pressure increase in the feed line, the method of transferring a cryogenic fluid can also comprises a step, before the transfer of cryogenic fluid, of cooling at least partially the feed line between the storage tank and the receiver.

If the receiver is a receiving tank, in order to collapse the pressure in the receiving tank and to allow faster loading of this receiving tank, the method of transferring a cryogenic fluid can also comprise, before the transfer of cryogenic fluid, a step of bringing the pressure down into the receiving tank. The pressure in the receiving tank can be brought down for example by spraying some cold cryogenic fluid in a tank vapour phase of the receiving tank.

The invention also concerns a transfer system for cryogenic fluid from a storage tank to a receiver, comprising a storage tank, a cryogenic pump and a output line connected at a bottom part of the storage tank,
characterised in that it also comprises:
- a supply line between the bottom part of the storage tank and an input of the cryogenic pump,
- means for vaporising fluid pumped by the cryogenic pump, and
- a pressure line connecting said means for vaporising fluid to an upper part of the storage tank.

Such a device is able to transferring a cryogenic fluid according to the above described method.

This transfer system can also comprise means for controlling the pressure in the storage tank. Said means comprise for example in a first embodiment a by-pass line for by-passing the means for vaporising the pumped fluid and a valve system for controlling the flow of the pumped fluid between the means for vaporising and the by-pass line. In another embodiment, these means for controlling the pressure in the storage tank can also comprise means for spraying cryogenic liquid into an upper part of the storage tank. A transfer system can have no pressure controlling means, a by-pass line as here above and/or vaporising means as here above and/or other pressure controlling means.

The cryogenic pump of the described transfer system can be driven with an electric motor, and said electric motor is for example supplied by a battery connected to at least one photovoltaic panel. In this way, the transfer system is an autonomous system. This is possible since the cryogenic pump can be a "little" pump with a limited power.

In order to allow a better transfer and avoid a pressure increase in the feed line, the transfer system can also comprise cooling means for cooling the output line.

If the receiver is a receiving tank, in order to collapse the pressure in the receiving tank and to allow faster loading of this receiving tank, the transfer system can also comprise means for spraying cryogenic fluid into the receiving tank.

The invention also concerns a trailer, characterised in that it comprises a transfer system as described here above.

These and other features of the invention will be now described with reference to the appended FIGS., which relate to preferred but not-limiting embodiments of the invention.

FIG. 1 illustrates on a same FIG. transfer systems of cryogenic fluid between tanks and also between a tank and an application pipeline.

FIG. 1 shows a main storage tank 2 adapted for containing a cryogenic fluid like Nitrogen, Oxygen, Air, Argon, Liquefied Natural Gas or . . . . We will consider in this description that the cryogenic fluid is LNG. This fluid will be also called LNG when it is in a gaseous phase.

A feed line 4 is connected at a bottom part of this main storage tank 2. A storage tank is usually manufactured with a bottom part and an upper part which can be distinguished because the tank does not only contain liquid but liquid and gas. For example the storage tank comprises a security valve (not shown) to limit the pressure in the tank and this valve is placed on the upper part of the tank so that it can vent the portion of the tank that contains gas.

The feed line 4 connects the main storage tank 2 to a trailer 6, to a bunkering ship 8 (which can also be a LNG fueled ship) and to a first LNG fueled ship 10. It is clear that a storage tank will never be connected at the same moment to a trailer and two ships. FIG. 1 here only illustrates that the main storage tank 2 can for example supply a trailer, or a storage tank on a ship, or a tank for supplying an engine on a ship.

The trailer 6 comprises a first mobile storage tank 12 which itself can supply a pipeline 14 or a secondary storage tank 16 or a second LNG fueled ship 18. FIG. 1 also foresees that this second LNG fuelled ship 18 can be supplied with LNG from the bunkering ship 8.

So FIG. 1 shows different kinds of transfers, like:
from a fixed tank to a transport tank,
from a mobile tank to a fixed or mobile tank,
from a mobile tank to an application pipeline for applications like for example peak-shaving or power generation, and
from a fixed tank to an application pipeline.

On FIG. 1, three transfer systems according to the invention are shown. These systems can be used for transferring LNG from the main storage tank 2 or the trailer 6 or the secondary storage tank 16 to a receiver (pipeline or receiving tank).

It is now referred to the main storage tank 2. The associated transfer system of LNG comprises a cryogenic pump 20 and means for vaporising LNG pumped by the cryogenic pump 20.

The cryogenic pump 20 is for example a centrifugal pump. It is connected to the bottom part of the main storage tank 2 by a supply line 22.

The means for vaporising LNG pumped by the cryogenic pump 20 is a vaporiser 24. This vaporiser 24 is for example a heat exchanger which exchanges heat between the pumped LNG and ambient air and/or water. The pumped LNG entering into the vaporizer 24 is mostly (in weight, i.e. more than 50% in weight of the pumped LNG) liquid while the LNG going out of the vaporizer 24 is mostly (in weight) gaseous. For example more than 90% of the LNG entering the vaporiser 24 is liquid and more than 90% of the LNG going out of the vaporiser 24 is gaseous.

The LNG coming out from the vaporiser 24 is lead to an upper portion of the main storage tank 2 by a pressure line 26.

As it can be seen on FIG. 1, a by-pass line 28 allows pumped LNG coming out from the cryogenic pump 20 going directly through the pressure line 26 to the upper part of the main storage tank 2. A three-way valve (not shown) can distribute the flow of pumped LNG between the vaporiser 24 and the by-pass line 28. It can vary the part of liquid pumped LNG to be vaporised by the vaporiser 24. This is a first mean to adapt the pressure in the main storage tank 2.

FIG. 1 shows also submersible pump 30 in the main storage tank 2. This pump supplies a spray header 32 by a line inside the main storage tank 2. This is a second mean to adapt the pressure in the main storage tank 2.

The trailer 6 also has a transfer system for cryogenic liquid. The first mobile storage tank 12 on the trailer 6 can be for example an ISO container. Its transfer system comprises a cryogenic pump 120 and a vaporiser 124. The cryogenic pump 120 is connected to a bottom part of the first mobile storage tank 12 by a supply line 122.

In this transfer system, liquid LNG is pumped through the supply line 122 by the cryogenic pump 120 from a bottom part of the first mobile storage tank 12. The pumped LNG is then (at least partially) vaporised in the vaporiser 124 and the gaseous vaporised LNG is sent by a pressure line 126 to an upper part of the first mobile storage tank 12.

In this transfer system, the cryogenic pump 120 is supplied in electric current by a solar panel 34 which is for example supported by the first mobile storage tank 12. In fact, the solar panel 34 is connected to a battery which supplies the cryogenic pump 120. To have an autonomous transfer system, it is also possible for example to supply the cryogenic pump 120 with electric current coming from a gas electric generator.

A transfer system is also associated to the secondary storage tank 16. Here, liquid LNG is pumped from a bottom part of the secondary storage tank 16 through a supply line 222 by a cryogenic pump 220. The pumped LNG is sent through a vaporiser 224 and led by a pressure line 226 to an upper part of the secondary storage tank 16.

As it can be seen on FIG. 1, the pressure line 226 has a derivation 36 which leads to a second spray header 232 inside an upper part of the secondary storage tank 16. The part of the flow in the pressure line 226 going through the spray header 232 is regulated by a valve 38.

Described below is the way in which LNG can be transferred from the storage tanks shown on FIG. 1.

The main storage tank 2 contains a cryogenic fluid (LNG) between 1 and 12 bar (1 bar=100,000 Pa) and presents a design pressure of 12 bar.

As shown on FIG. 1, LNG from the main storage tank 2 can be transferred to a receiver which can be, in this example, the trailer 6, a storage tank on the bunkering ship 8 or the fuel tank of the first LNG fueled ship 10. Each of these receiving tanks is designed for at least 12 bar as well. The receiving tanks can be filled from the top in order to collapse their boil-off-gas pressure or by the bottom in order to increase their boil-off-gas pressure. These two ways are illustrated for bunkering ship 8 and first LNG fueled ship 10.

The required flow for filling the first mobile storage tank 12 on the trailer 6 is for example comprised between 500 to 1000 l/min at a pressure going up to 12 bar.

The required flow for filling the tank on the bunkering ship 8 is for example comprised between 1000 to 10000 l/min at a pressure going up to 12 bar.

The required flow for filling the fuel tank on the first LNG fueled ship 10 is for example comprised between 500 to 3000 l/min at a pressure going up to 12 bar.

The method for transferring LNG from the main storage tank 2 to the receiving tank is to use the cryogenic pump 20 and the vaporiser 24 in order to pressurise the main storage tank 2 in order to provide enough pressure to transfer the liquid LNG contained in the main storage tank 2 and replace the LNG that is taken off the tank by gaseous LNG.

By pumping liquid LNG from the bottom of the main storage tank 2 with a flow comprised between 8 and 160 l/min by the cryogenic pump 20, the required flow of LNG going to the receiving tanks can be obtained. The liquid pumped LNG goes through the vaporiser 24 in order to be converted into gas and increases its volume by a factor of about 600. This gas is led by the pressure line 26 back into the main storage tank 2 in order to push the LNG located in the bottom of the tank through the feed line 4 into the receiving tank.

In order to limit the pressure into the main storage tank 2, a part of the pumped LNG can go through the by-pass line 28 and go back to the main storage tank 2 in liquid phase. It is also possible to limit the pressure in the main storage tank 2 by spraying cold liquid LNG in the part of the tank containing gaseous LNG in order to condense a part of this gaseous LNG.

FIG. 1 also illustrates a transfer of liquid LNG from trailer 16. It is suggested to transfer LNG from this first mobile storage tank 12 either:
- into the application pipeline 14 with a flow for example from 500 to 1500 l/min and a pressure at up to 20 bar, or
- into the secondary storage tank 16 with a flow for example from 500 to 1500 l/min and a pressure at up to 20 bar, or
- into a fuel tank of the second LNG fueled ship 18 with a flow for example from 500 to 1500 l/min and a pressure at up to 12 bar.

The transfer is realised in the same way than explained here above for the main storage tank. Cryogenic pump 120 pumps liquid LNG in the first mobile storage tank 12 which is then vaporised in the vaporiser 124 and fed back into the tank in order to maintain in the tank a pressure of about 12 or 20 bar and to replace the liquid LNG going out from the tank by gaseous LNG.

The same applies also for a transfer from the secondary storage tank 16 to the application pipeline 14. Here, liquid LNG is pumped by cryogenic pump 220 and vaporised by vaporiser 224 before being sent back through pressure line 226 into the tank.

In order to have a high pressure, it is foreseen to also spray a part of the vaporised LNG into the secondary storage tank 16.

As also suggested on FIG. 1, LNG can also been transferred from the bunkering ship 8 directly to the second LNG fueled ship 18. However, the corresponding transfer system with its pump and its vaporiser is not shown on FIG. 1.

Before the LNG transfer, the LNG feed line going from a storage tank (main storage tank 2 or first mobile storage tank 12 or secondary storage tank 16) to a receiver (trailer 6, storage tank on a ship or fuel tank or application pipeline) will have to be cooled down in order to allow a better transfer and avoid LNG flashing and pressure increase into the feed line. The feed line can then be pre-cooled during the pump cool down time by sending some of the cold gas from the storage tank into the feed line. Since pump 20 is smaller than a prior art pump for LNG transfer, the cooling step for cooling the pump will be shorter.

On the receiving tank, an automatic valve system should allow at the beginning of the loading operation to spray some cold LNG on the tank vapour phase in order to collapse the pressure and allow faster loading.

The advantage of the solution proposed in this description is that it benefits from the energy savings of the vaporisation with either sea water or ambient air that is free and does not need any additional energy. Moreover, it allows using a smaller, standard and lower cost pump that takes less spaces than a big LNG transfer pump. The pump for ecological reasons as it is much smaller could be driven by solar panels mounted onto the tank itself making it a complete autonomous system.

The proposed solution also allows a smaller footprint of the transfer system since the cryogenic pump can be smaller. Therefore an existing pump range might be suitable for a liquid transfer, also for high flow rates at high pressure (up to 20 bar for example).

Obviously, one should understand that the above detailed description is provided only as embodiment examples of the invention. However secondary embodiment aspects may be adapted depending on the application, while maintaining at least some of the advantages cited.

The invention claimed is:

1. A method for transferring cryogenic fluid from a storage tank (2; 12; 16) to a receiver (6; 8; 10; 14; 16; 18) or to an application device, comprising:
   a— removing cryogenic liquid from the storage tank (2; 12; 16) via a supply line (22) and pumping the removed cryogenic liquid to form pumped cryogenic liquid,
   b— vaporizing at least partially the pumped cryogenic liquid to form vaporized cryogenic liquid,
   c— pressurizing the storage tank (2; 12; 16) with the vaporized cryogenic liquid, and
   d— transferring cryogenic fluid from the storage tank (2; 12; 16) to the receiver (6; 8; 10; 14; 16; 18) or application device through a feed line (4) which is separate from the supply line (22), said feed line (4) being located between the storage tank (2; 12; 16) and the receiver (6; 8; 10; 14; 16; 18) or application device.

2. The method according to claim 1, further comprising regulating the pressure in the storage tank (2) by varying the amount of pumped cryogenic liquid that is vaporized.

3. The method according to claim 1, further comprising regulating the pressure in the storage tank (2; 16) by spraying cryogenic liquid in an upper part of the storage tank (2; 16).

4. The method according to claim 1, further comprising, before the transfer of cryogenic fluid, cooling at least partially the feed line (4) between the storage tank (2; 12; 16) and the receiver (6; 8; 10; 14; 16; 18).

5. The method according to claim 1, wherein the receiver is a receiving tank (6; 8; 10; 16; 18), and the method further comprises, before the transfer of cryogenic fluid, reducing pressure within the receiving tank (6; 8; 10; 16; 18).

6. The method according to claim 5, wherein the pressure in the receiving tank (6; 8; 10; 16; 18) is reduced by spraying cold cryogenic fluid in a tank vapor phase section of the receiving tank (6; 8; 10; 16; 18).

7. A transfer system for transferring cryogenic fluid from a storage tank (2; 12; 16) to a receiver (6; 8; 10; 14; 16; 18), said transfer system comprising:
the storage tank (2; 12; 16), a cryogenic pump (20; 120; 220) and an output line connected at a bottom part of the storage tank (2; 12; 16) and connected to said received,
a supply line (22; 122; 222) between the bottom part of the storage tank (2; 12; 16) and an input of the cryogenic pump (20; 120; 220), said supply line (22; 122; 222) being separate from the output line,
means for vaporizing fluid pumped by the cryogenic pump (20; 120; 220), and
a pressure line (26; 126; 226) connecting said means for vaporizing fluid to an upper part of the storage tank (2; 12; 16).

8. The transfer system according to claim 7, further comprising means for controlling pressure in the storage tank.

9. The transfer system according to claim 8, wherein the means for controlling pressure in the storage tank comprises a by-pass line (28) for a portion of the pumped fluid to by-pass the means for vaporizing (24) the pumped fluid, and a valve system for controlling the flow of the pumped fluid between the means for vaporizing (24) and the by-pass line (28).

10. The transfer system according to claim 8, wherein the means for controlling pressure in the storage tank comprise means for spraying (32) cryogenic liquid into an upper part of the storage tank (2).

11. The transfer system according to claim 7, wherein the cryogenic pump (20; 120; 220) is driven with an electric motor, and said electric motor is supplied by a battery connected to at least one photovoltaic panel (34).

12. The transfer system according to claim 7, further comprising cooling means for cooling the output line.

13. The transfer system according to claim 7, further comprising a receiver which is a receiving tank (6; 8; 10; 16; 18), and means for spraying cryogenic fluid into the receiving tank.

14. A trailer (16) comprising a transfer system (12, 20, 24) according to claim 7.

15. The transfer system according to claim 10, wherein the means for spraying (32) cryogenic liquid into an upper part of the storage tank comprises a submersible pump (30) within the storage tank which supplies a spray header (32) via a line inside the storage tank.

16. The method according to claim 1, wherein the removed cryogenic is pumped at a flow rate of between 8 and 160 l/min.

17. The method according to claim 1, wherein a portion of the pumped cryogenic liquid that is not vaporized is combined with the vaporized cryogenic liquid and the combined fluids are used to pressurize the storage tank.

18. The transfer system according to claim 9, wherein the by-pass line (28) is connected to the pressure line such that the portion of the pumped fluid that by-passes the means for vaporizing is sent to said upper part of the storage tank.

* * * * *